United States Patent
Johnson (10) Patent No.: US 7,583,269 B2
(45) Date of Patent: *Sep. 1, 2009

(54) WINDOW SYSTEM 2D GRAPHICS REDIRECTION USING DIRECT TEXTURE RENDERING

(75) Inventor: Deron D. Johnson, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 11/054,297

(22) Filed: Feb. 9, 2005

(65) Prior Publication Data

US 2005/0179691 A1 Aug. 18, 2005

Related U.S. Application Data

(60) Provisional application No. 60/545,241, filed on Feb. 17, 2004.

(51) Int. Cl.
*G06T 11/40* (2006.01)

(52) U.S. Cl. .................. 345/552; 345/419; 345/582

(58) Field of Classification Search ............. 345/548, 345/552; 715/757, 782, 848–852
See application file for complete search history.

(56) References Cited

U.S. PATENT DOCUMENTS

| 5,790,130 A | * | 8/1998 | Gannett ................ 345/587 |
| 6,597,358 B2 | * | 7/2003 | Miller .................. 345/427 |
| 7,290,216 B1 | | 10/2007 | Kawahara et al. |
| 2004/0090467 A1 | | 5/2004 | Bonura et al. |
| 2005/0057497 A1 | | 3/2005 | Kawahara |
| 2005/0060661 A1 | | 3/2005 | Kawahara et al. |
| 2005/0104880 A1 | | 5/2005 | Kawahara et al. |
| 2005/0182844 A1 | | 8/2005 | Johnson et al. |
| 2005/0204306 A1 | | 9/2005 | Kawahara et al. |

OTHER PUBLICATIONS

Niklas Elmqvist; "3Dwm: A Platform for Research and Development of Three-Dimensional User Interfaces"; Technical Report No. 2003-04; 2003; 25 pages; Göteborg, Sweden.
Maarten Van Dantzich, George Robertson and Vadim Gorokhovsky; "Application Redirection: Hosting Windows Applications in 3D"; ACM Workshop on New Paradigms in Information Visualization and Manipulation; 1999; pp. 87-91; Kansas City, MO, U.S.A.
U.S. Appl. No. 11/054,488, filed Feb. 9, 2005.
U.S. Appl. No. 11/054,154, filed Feb. 9, 2005.

* cited by examiner

*Primary Examiner*—Kee M Tung
*Assistant Examiner*—David H Chu
(74) *Attorney, Agent, or Firm*—Robert C. Kowert; Meyertons, Hood, Kivlin, Kowert & Goetzel, P.C.

(57) ABSTRACT

The 3D window system utilizes hardware accelerated window system rendering to eliminate the pixel copy step of 3D window system output redirection. The 3D window system includes a window server that directs the window system device driver graphics routines to render into the texture memory of a graphics device.

30 Claims, 8 Drawing Sheets

WINDOW SYSTEM 2D GRAPHICS REDIRECTION USING DIRECT TEXTURE RENDERING

BENEFIT CLAIM

This application claims the benefit of U.S. Provisional Application No. 60/545,241, filed on Feb. 17, 2004, entitled "Window System 2D Graphics Redirection Using Direct Texture Rendering". U.S. Provisional Application No. 60/545,241 is hereby incorporated by reference in it entirety.

BACKGROUND OF THE INVENTION

1. Field of the Invention

This invention is related to the field of graphical user interfaces, and more particularly, to a window server which is configured to support the operation of a 3D window system.

2. Description of the Related Art

A three-dimensional (3D) window system may be configured to support client applications written for a conventional 2D window system such as the X11 window system. Client applications of this sort are referred to herein as "conventional" applications. The 3D window system executes on a host computer which couples to a graphics accelerator. In response to 2D graphics API calls made by a conventional client application, the 3D window system may (a) direct the host computer to perform 2D graphical rendering and to store the pixels resulting from said rendering in virtual memory of the host computer and (b) direct the transfer of the pixels from the virtual memory to the texture memory of the graphics accelerator. This strategy of rendering to host virtual memory and then copying to texture memory is slow. Increased processing speed is very much sought after. It would also be desirable to liberate the host computer of the computational burden of having to perform the 2D rendering. The acronym API stands for "application programming interface".

In the paper "Application Redirection: Hosting Windows Applications in 3D", presented at the ACM Workshop on New Paradigms in Information Visualization (NPIV99), by Maarten van Dantzich et al. describe a 3D window system which uses the strategy described above.

In Technical Report no. 2003-04, entitled "3Dwm: A Platform for Research and Development of Three-Dimensional User Interfaces", published by the Dept. of Computing Science at Chalmers University of Technology and Göteborg University, Niklas Elmqvist discloses a 3D window system that uses a VNC X11 Server to implement the strategy described above. VNC is acronym for Virtual Network Computing.

SUMMARY

In one set of embodiments, a 3D window system may include a window server and a display server. The window server directs the 2D rendering of conventional client applications directly into texture memory of a graphics device, whence it can be mapped onto 3D objects in the 3D display model. The use of hardware acceleration (i.e., the graphics device) may increase rendering rate. This methodology of directing 2D rendering to texture memory liberates the host memory that would have been consumed under the traditional methodology of rendering to host memory and then copying to texture memory. Thus, the 3D window system may have a smaller memory footprint.

The window server uses a 2D graphics driver to convert its 2D graphics API rendering commands into appropriate commands for a particular graphics device. In order to support a set of graphics devices, a 2D graphics driver needs to be implemented for each graphics device. For example, in order to use an NVIDIA GeForce FX 5900 graphics device within the X11 window system, a DDX driver needs to be written for that graphics device. This DDX driver translates DDX interface calls into operations which are appropriate for that graphics device.

In some embodiments, the device driver of the window server may be constructed by modifying the device driver of a conventional 2D window system (such as the X11 window server or Microsoft Windows) to use render to texture. ("Render to texture" is a rendering mode, supported by many modern graphics accelerators, in which the results of rendering operations are stored into texture memory.) The result will be that the 2D graphics API calls are rendered directly into the texture without the use of some other intermediate memory.

In one embodiment, if a graphics device supports a unified memory architecture (UMA), in which texture memory appears to the device's hardware rendering engine to be identical to other video memory, the window system device driver may be modified to allocate from texture memory a "backing texture" for the window. Instead of rendering directly into the on-screen window, the device driver performs the same rendering commands but directs them into the backing texture instead. From there, the 3D window system can map the backing texture onto 3D objects in its 3D display model.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The following patent applications are hereby incorporated by reference in their entirety:
(1) U.S. Provisional Application No. 60/545,246, filed on Feb. 17, 2004, entitled "Multiprocess Input Redirection in a 3D Window System", invented by Deron D. Johnson;
(2) U.S. Provisional Application No. 60/545,266, filed on Feb. 17, 2004, entitled "Efficient Communication in a Client-Server Scene Graph System", invented by Johnson, Kawahara, Byrne, Rushforth and Twilleager;
(3) U.S. Provisional Application No. 60/545,241, filed on Feb. 17, 2004, entitled "Window System 2D Graphics Redirection Using Direct Texture Rendering", invented by Deron D. Johnson;
(4) U.S. patent application Ser. No. 11/054,488, filed on Feb. 9, 2005, entitled "Multiprocess Input Redirection in a 3D Window System", invented by Deron D. Johnson; and
(5) U.S. patent application Ser. No. 11/054,154, filed on Feb. 9, 2005 entitled "Efficient Communication in a Client-Server Scene Graph System", invented by Johnson, Kawahara, Byrne, Rushforth and Twilleager.

In one set of embodiments, a 3D window system may be configured to manage a 3D user interface for a set of conventional client applications. As used herein the term "conventional client application" refers to an application which is configured to create windows through a conventional 2D window system API (such as the API of the X11 window system or the API of Microsoft Windows) and to modify these windows through a conventional 2D graphics API (such as the API of the X11 window system or the API of Microsoft Windows) and/or a 3D graphics API (such as OpenGL or Direct3D). Such windows are referred to herein as conventional windows.

Examples of conventional client applications include email clients, web browsers, word processors, spreadsheets, photo viewers/editors, video viewers/editors, video games, database applications, etc.

The 3D window system maps the contents of the conventional windows as textures onto the surfaces of 3D objects in a 3D environment. The 3D window system directs the 3D objects to be rendered onto a set of one or more display devices. Thus, the user may read an email on the surface on one 3D object and watch a video on the surface on another 3D object. The 3D window system may be configured to respond to user inputs and manipulate various properties of the 3D objects such as position, orientation, size and transparency.

The 3D window system and the conventional client applications may execute on the same computer in the same operating system environment. Alternatively, the 3D window system may execute on one computer and the conventional client applications may execute on a number of other computers which couple to the one computer by any of a variety of well-known communication mechanisms.

The host computer on which the 3D window system executes may couple to one or more display devices, one or more output devices such as speakers, one or more input devices, and one or more graphics accelerators. Display devices include devices such as monitors, projectors and head-mounted displays. Input devices include devices such as keyboards, mice, joysticks, track balls, game controllers, data gloves, microphones, sensors of physical properties, etc.

Figure 1:
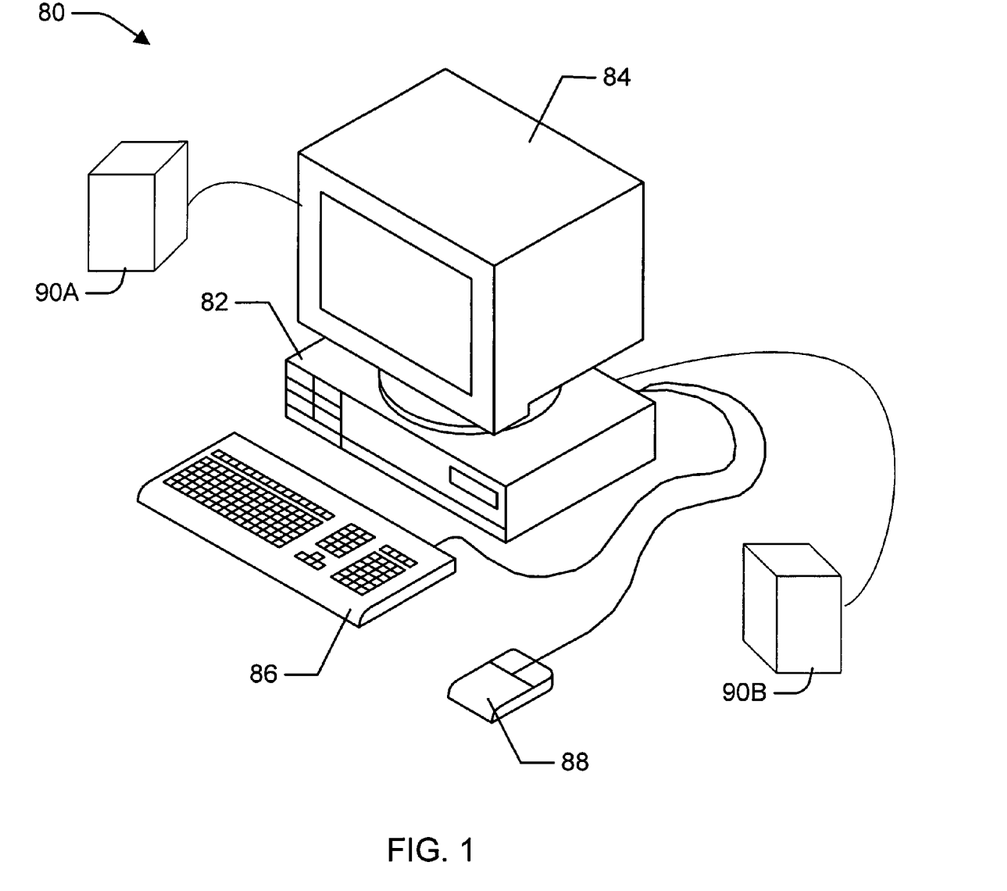
FIG. 1 illustrates one embodiment of a computer system on which the 3D window system and/or the conventional client applications may execute.

FIG. 1 illustrates one embodiment of a computer 80 which may be used to host execution of the 3D window system and/or the conventional client applications. Computer 80 may include system unit 82, monitor 84, keyboard 86, mouse 88, speakers 90A and 90B, and a graphics accelerator (not shown).

Figure 2:
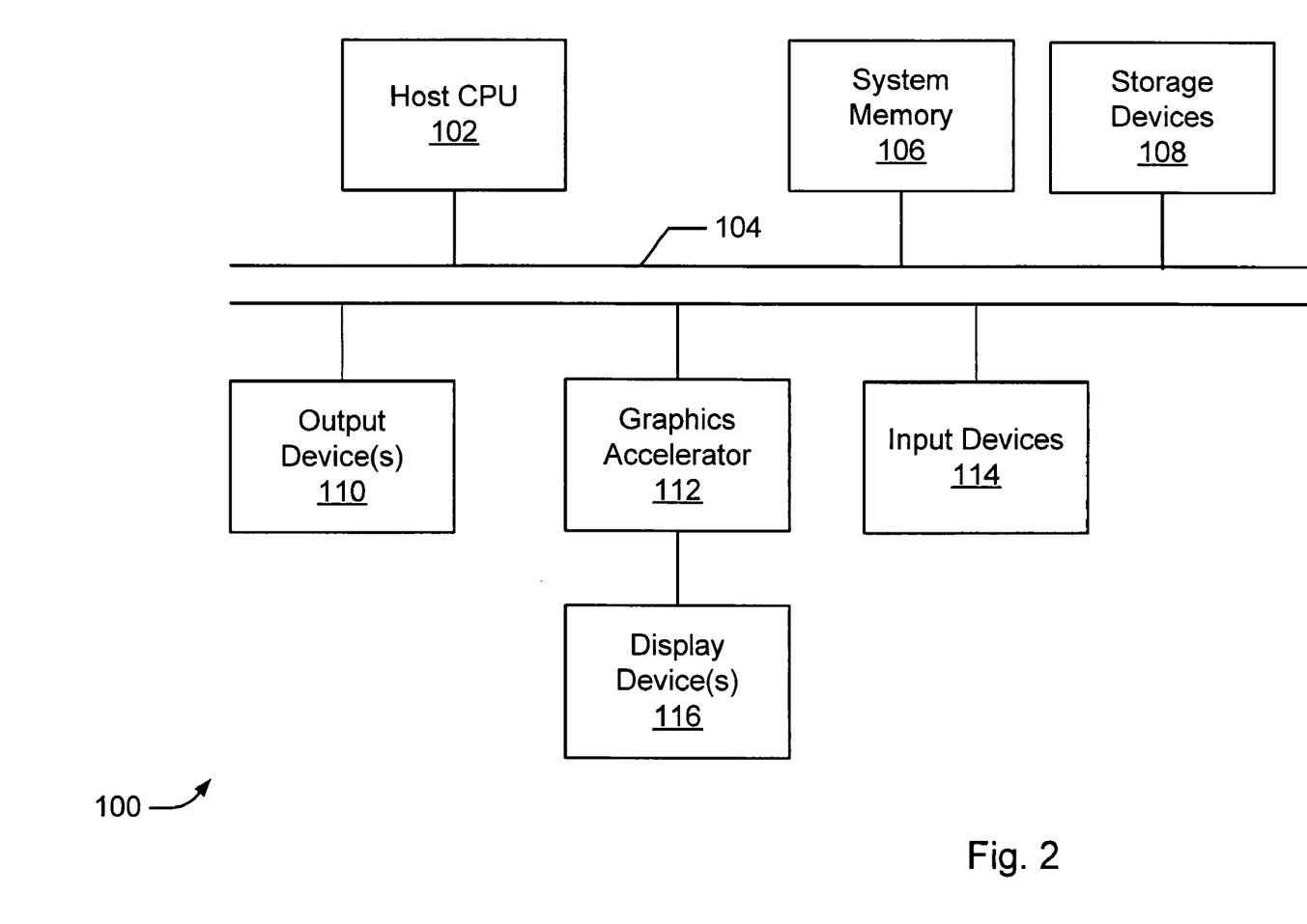
FIG. 2 is a block diagram for one embodiment of a host computer on which the 3D window system and/or the conventional client applications may execute.

FIG. 2 is a block diagram for one embodiment of a computer 100 that may be used to host execution of the 3D window system and/or the conventional client applications. Computer 100 includes one or more central processing units (CPUs) 102, a system memory 106 (including, e.g., arrays of semiconductor memory devices), storage devices 108 (such as CD-ROM drives, hard drives, floppy drives, tape drives), one or more output devices 110 such as speakers, a graphics accelerator 112, one or more input devices 114 (such as a mouse, a keyboard, physical sensors) and one or more display devices 116. The graphics accelerator 112 drives the display devices 116. These devices and system components may be coupled through a system bus 104.

Figure 3:
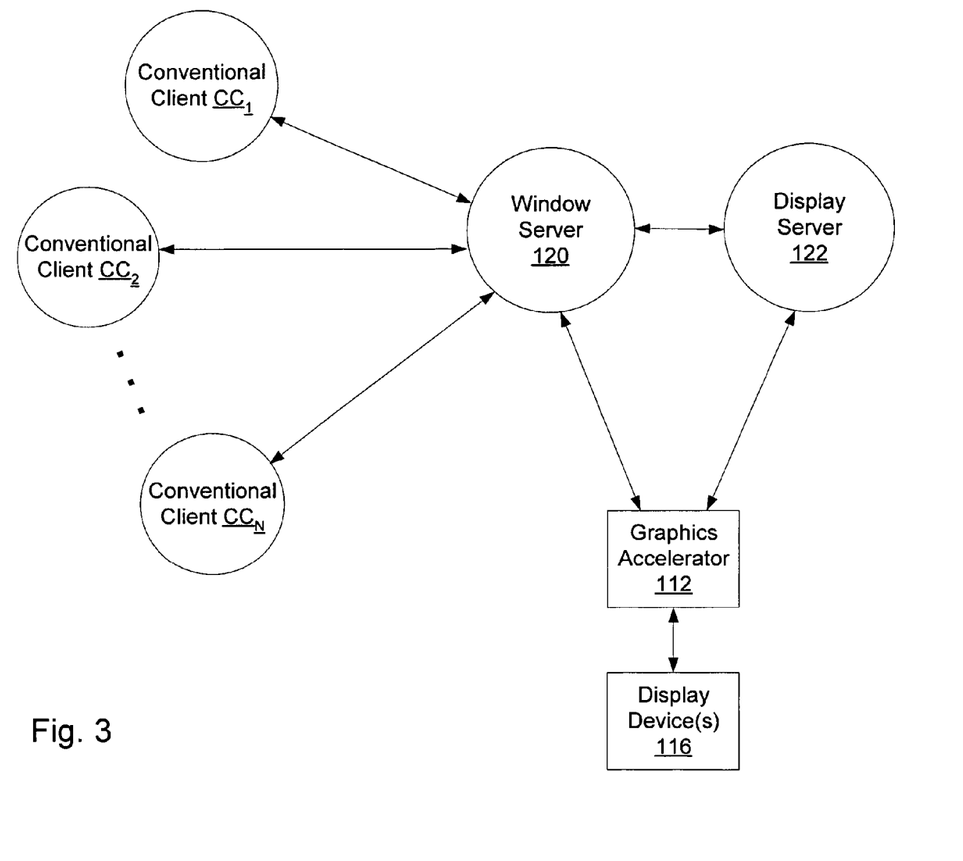
FIG. 3 is diagram of software and hardware elements of a 3D window system.
Figure 4:
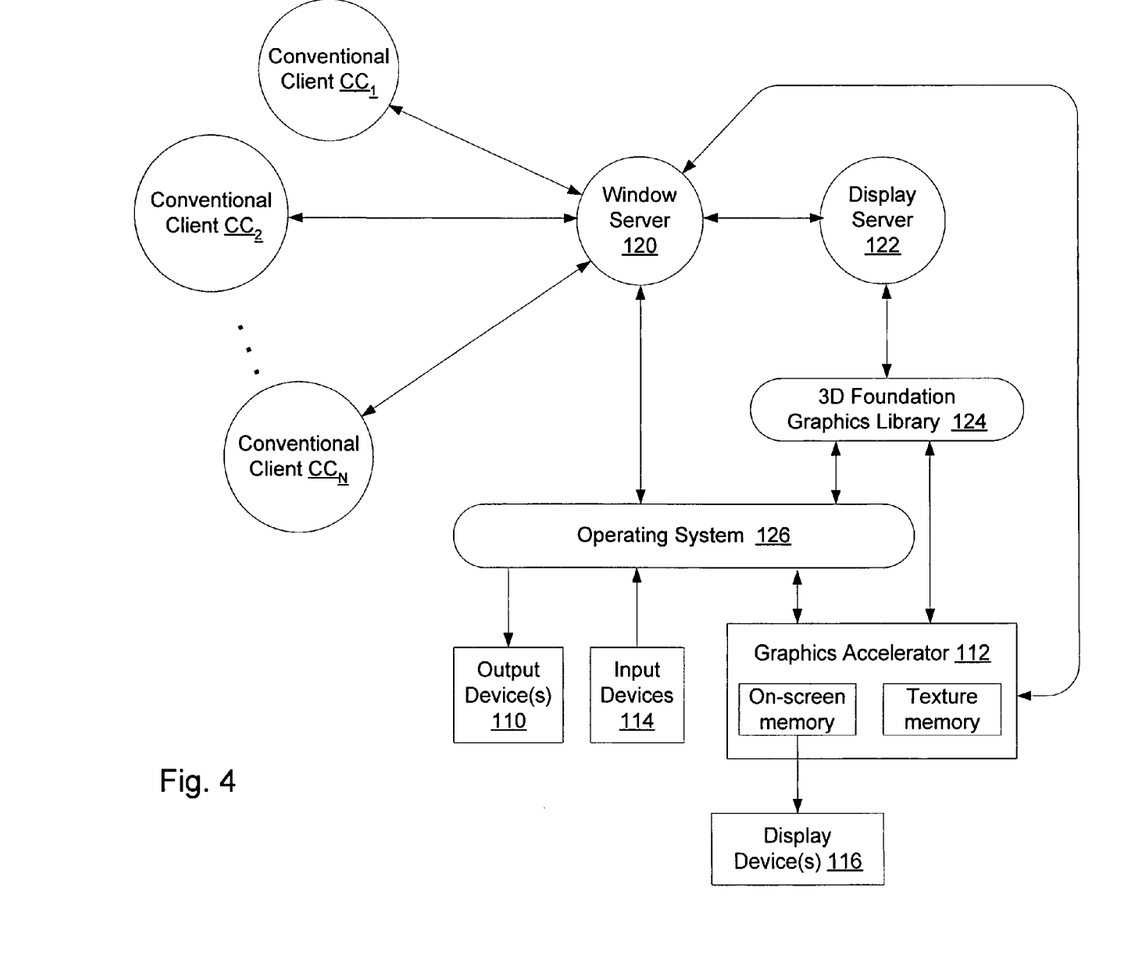
FIG. 4 is a diagram elaborating one embodiment of the software infrastructure between the servers (i.e., window server and display server) and the graphics accelerator.

The 3D window system may include a window server 120 and a display server 122 as suggested by FIG. 3. (The display server may reside in the same process as the window server, or, may reside in a process separate from the window server.) The window server 120 may interact with a set of one or more conventional client applications denoted $CC_1, CC_2, \ldots, CC_N$, where N is a positive integer. The window server and the display server communicate with a graphics accelerator which couples to the host computer system (e.g., graphics accelerator 112 of FIG. 2). This communication may be achieved through one or more layers of intervening software infrastructure. For example, as illustrated in FIG. 4, the window server may communicate with the output device(s) 110, graphics accelerator 112 and input devices 114 through an operating system 126 such as the UNIX operating system or the Microsoft Windows operating system. The display server may communicate with the graphics accelerator through a 3D foundation graphics library 124 (such as OpenGL or Direct3D) and the operating system 126. In some embodiments, the 3D foundation graphics library and/or the window server may be configured to bypass the operating system and communicate with the graphics accelerator directly.

Graphics accelerators typically include both on-screen memory and texture memory. As used herein, the term "on-screen memory" is memory within the graphics accelerator that is used to feed the video output of the graphics accelerator. The texture memory is memory within the graphics accelerator that is used to store texture maps that are applied to the surfaces of graphical objects.

The results of rendering operations performed by a graphics accelerator are typically stored into on-screen memory so that those rendering results may be transformed into video output and appear on a display device. However, many modern graphics accelerators are configured to support an optional render-to-texture mode in which the results of rendering operations are stored into texture memory.

The window server relies on a graphics accelerator which supports the render-to-texture feature to liberate the host computer from the labor of 2D graphics rendering. In particular, a conventional client application may assert 2D graphics rendering requests, designating a conventional window, to the window server. The window server directs the graphics accelerator to perform the 2D graphics rendering and to store the resulting pixels into an area, i.e., a texture map, which has been allocated in texture memory. Thus, the image contents of the conventional window are rendered into the texture map.

Since the host computer is not rendering to host virtual memory, the step of copying from host virtual memory to texture memory is eliminated.

The display server manages a scene graph which contains representations of 3D graphical objects. Part of the on-going action of the display server is to repeatedly traverse the scene graph to induce rendering of the 3D graphical objects. (Scene graphs and their traversal to induce object rendering are well known concepts to those skilled in the art of computer graphics, and especially to users of Java3D™.)

When the display server accesses a node in the scene graph that corresponds to a conventional window, the display server may (a) configure the graphics accelerator for rendering to on-screen memory using the texture map corresponding to the conventional window as a source for texture and (b) send the 3D object geometry of the node to the graphics accelerator. The 3D object geometry defines a 3D object on which the contents of the texture map (i.e., the conventional window image contents) are to be painted.

In one set of embodiments, the window server may be configured to present an application-programming interface (API) to conventional client applications that is identical to (or, similar to, or, a superset of) the API presented by a conventional 2D window system such as the X11 Window System or a version of Microsoft Windows. Thus, conventional client applications which have been designed to operate in the context of the conventional 2D window system may operate in the context of the 3D window system without code modification. Alternatively, the API of the window server may be designed from scratch without emulating any conventional 2D window system API.

A conventional client application may issue a request for the creation of a conventional window by calling an API function (or perhaps, a plurality of API functions) of the window server. In response to this function call, the window server may assert commands that induce the allocation of a texture map in the texture memory of the graphics accelerator which is coupled to the host computer system, and send an interprocess message to the display server indicating that 2D graphics rendering associated with the conventional window will be directed to texture memory. The message also includes an identifier of the texture map.

In response to receiving the interprocess message, the display server may add a node (or set of nodes) corresponding to the conventional window to the scene graph. The node may include the specification of a 3D object (e.g., a 3D object having one or more flat surfaces such as a rectangular parallelepiped) on which the texture map is to be painted by the graphics accelerator. The texture map identifier may be stored in a texture map attribute of the node.

After the window creation request, the conventional client application may assert 2D graphics rendering requests, designating the conventional window, to the window server by making calls to API rendering functions of the window server. Each rendering function call may generate a corresponding 2D graphics rendering request. In response to each 2D graphics rendering request, the 2D window server may (a) configure the graphics accelerator for rendering to the texture map corresponding to the designated conventional window, (b) translate the 2D graphics rendering request into device rendering commands recognizable by the graphics accelerator, and (c) send the device rendering commands to the graphics accelerator. The graphics accelerator performs rendering operations in response to receiving the device rendering commands. Because the graphics accelerator has been configured for rendering to texture, the pixel data resulting from said rendering operations are automatically stored into the texture map in texture memory instead of on-screen memory.

In one embodiment, the API of the window server may be defined so that the graphics context of the display surface is passed as an argument of each API rendering function. This implies that the graphics context may change from one rendering function call to the next.

Alternatively, the API of the window server may be defined so that the API rendering functions do not include graphics context as a parameter. Rather, all rendering requests rely on a current graphics context which is set and/or modified by calling a special API function. A graphics context remains in force until it is changed by virtue of another call to the special API function. In this alternative API style of handling graphics context, it may not be necessary to perform the step (a) of configuring the graphic accelerator prior to each rendering request. Instead, the window server may configure the graphics accelerator for rendering to the texture map in response to calls to the special API function.

As noted above, the display server traverses the scene graph to induce graphical object rendering. When the traversal reaches a node corresponding to a conventional window, the display server may instruct the 3D foundation graphics library to configure the graphics accelerator to render using the texture map that has been allocated for the conventional window. To this end, the display server may pass the texture identifier to the 3D foundation graphics library. Furthermore, the display server directs the 3D foundation graphics library to transfer the 3D object geometry stored in the node, or associated with the node, to the graphics accelerator.

The 3D foundation graphics library may execute in the same process as the display server, or, in a separate process from the display server. A mechanism for passing the texture identifier to the 3D foundation graphics library in the case where the 3D foundation graphics library executes in a separate process from the display server is disclosed in:

U.S. Provisional Application No. 60/539,434, filed on Jan. 26, 2004, entitled "Redirecting the Output of Graphics Rendering Calls", invented by Deron D. Johnson, which is hereby incorporated by reference in its entirety; and     U.S. patent application Ser. No. 10/959,932, filed on Oct. 5, 2004, entitled "Method and Apparatus for Redirecting the Output of Direct Rendering Graphics Calls", invented by Deron D. Johnson, which is hereby incorporated by reference in its entirety.

In response to receiving the 3D object geometry, the graphics accelerator renders the 3D object geometry into pixels (or supersamples) based on a current graphics context, applies data from the texture map defined by the texture map identifier onto the pixels (or supersamples), and stores the textured pixels (or textured supersamples) into on-screen memory. The textured pixels (or textured supersamples) are read from the on-screen memory and used to generate video output which feeds a display device. Thus, the image contents of the conventional window created by the conventional client application are visually represented on a surface of the 3D object (e.g., a front surface of a rectangular parallelepiped, or, on the curved surface of a cylinder).

In the case where the graphics accelerator is configured to render into pixels, video output circuitry in the graphics accelerator may read the textured pixels from the on-screen memory and generate a video output stream (or analog video output signal) from the textured pixels in order to feed the display device. In the case where the graphics accelerator is configured to render into supersamples, the graphics accelerator may include filtering circuitry which reads the textured supersamples from the on-screen memory and filters the textured supersamples to form the video output.

In one set of embodiments, the window server may be constructed from the server of a conventional 2D window system (such as the X11 Window System) by modifying the device dependent routines of the conventional 2D window system server. Thus, the window server may include the device independent routines of the conventional 2D window system server and modified versions of the device dependent routines of the conventional 2D window system server. (The terms "device dependent routines" and "device driver routines" are used synonymously herein. The terms "graphics accelerator" and "graphics device are used synonymously.)

In another set of embodiments, the window server may be constructed from the server of a conventional 2D window system (such as the X11 Window System) by (a) adding one or more device dependent routines to the device dependent routines of the conventional 2D window system server and (b) interposing an intermediate set of routines between the device independent routines of the conventional 2D window system server and the augmented set of device dependent routines. The augmented set means the device dependent routines of the conventional 2D window system server plus the one or more added device dependent routines. The one or more added routines know how to configure the graphics device for rendering to texture memory. The intermediate set of routines are interposed so that the device independent routines call the routines of the intermediate set instead of the device dependent routines of the conventional 2D window system server, and the intermediate set of routines call the device dependent routines of the augmented set. The intermediate set of routines present to the device independent routines a calling interface which is identical to the interface presented by the device dependent routines. Thus, in this set of embodiments, the device independent routines and the device dependent routines of the conventional 2D window system server do not require modification to operate as part of the current window server.

In yet another set of embodiments, the window server may be constructed from the server of a conventional 2D window system (such as the X11 Window System) by modifying the device dependent routines of the conventional 2D window system server and interposing an intermediate set of routines between the device independent routines of the conventional 2D window system server and the modified device dependent routines.

Routines of the intermediate set may direct the device dependent routines to allocate texture maps in response to calls from the device independent routines to create windows. Alternatively, the allocation of a texture map corresponding to a conventional window may be postponed until the device independent routines make their first rendering request to render to the conventional window.

Routines of the intermediate set may also direct the device dependent routines to configure the graphics accelerator for rendering to the texture maps in response to the calling of rendering routines by the device independent routines.

These routines of the intermediate set may also send the interprocess messages to the display server.

Figure 5:
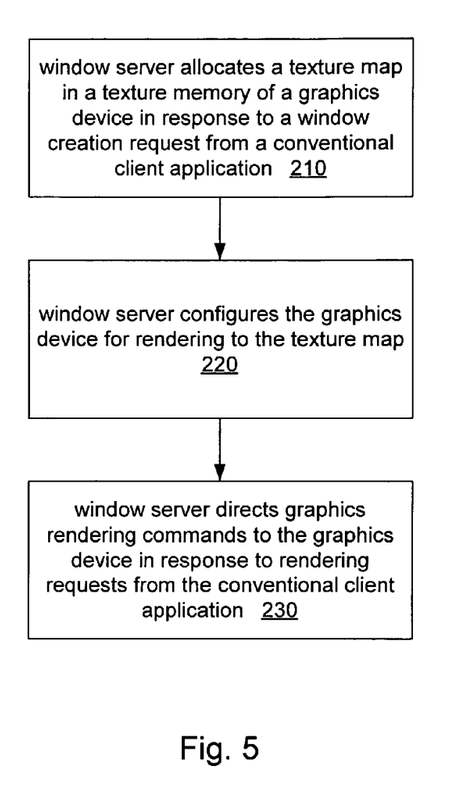
FIG. 5 illustrates one embodiment of a method for operating a window server to induce rendering to texture for a conventional window.

In one set of embodiments, a window server, executing on a host computer, may be configured to perform the following method as illustrated in FIG. 5. In step 210, the window server allocates a texture map in a texture memory of a graphics device in response to a window creation request asserted by a conventional client application.

In step 220, the window server configures the graphics device for rendering to the texture map. This configuration step may occur in response a first rendering request, designating the conventional window, asserted by the conventional client application. Alternatively, this configuration step may occur in response to each rendering request, designating the conventional window, asserted by the conventional client application.

In step 230, the window server directs graphics rendering commands to the graphics device in response to rendering requests from the conventional client application. The graphics device performs rendering operations in response to the rendering commands and stores the resultant data of the rendering operations into the texture map.

Figure 6:
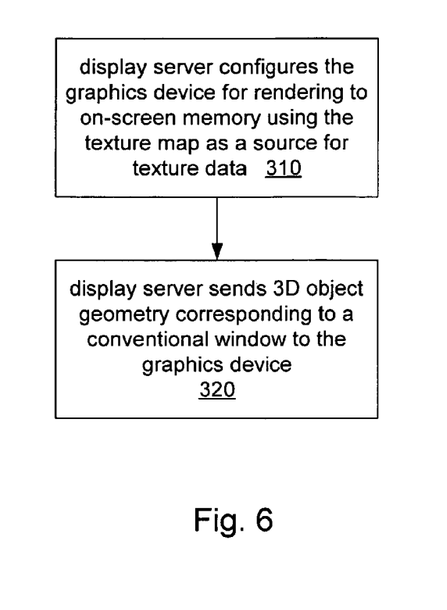
FIG. 6 illustrates one embodiment of a method for operating a display server.

Furthermore, a display server may be configured to execute the steps illustrated in FIG. 6. In step 310, the display server may configure the graphics device for rendering to on-screen memory using the texture map as a source for texture data. The texture map contains the image contents of the conventional window as a result of steps 220 and 230 of FIG. 5 having been previously executed. In step 320, the display server may send 3D object geometry corresponding to the conventional window to the graphics device. The graphics device renders the 3D object geometry using the texture map and stores the resulting pixels into on-screen memory. Output circuitry in the graphics device reads the pixels from the on-screen memory and generates video output from the pixels to feed a display device.

The display server may execute in a separate process from the window server. In one embodiment, the display server executes on a separate host computer from the window server.

Figure 7:
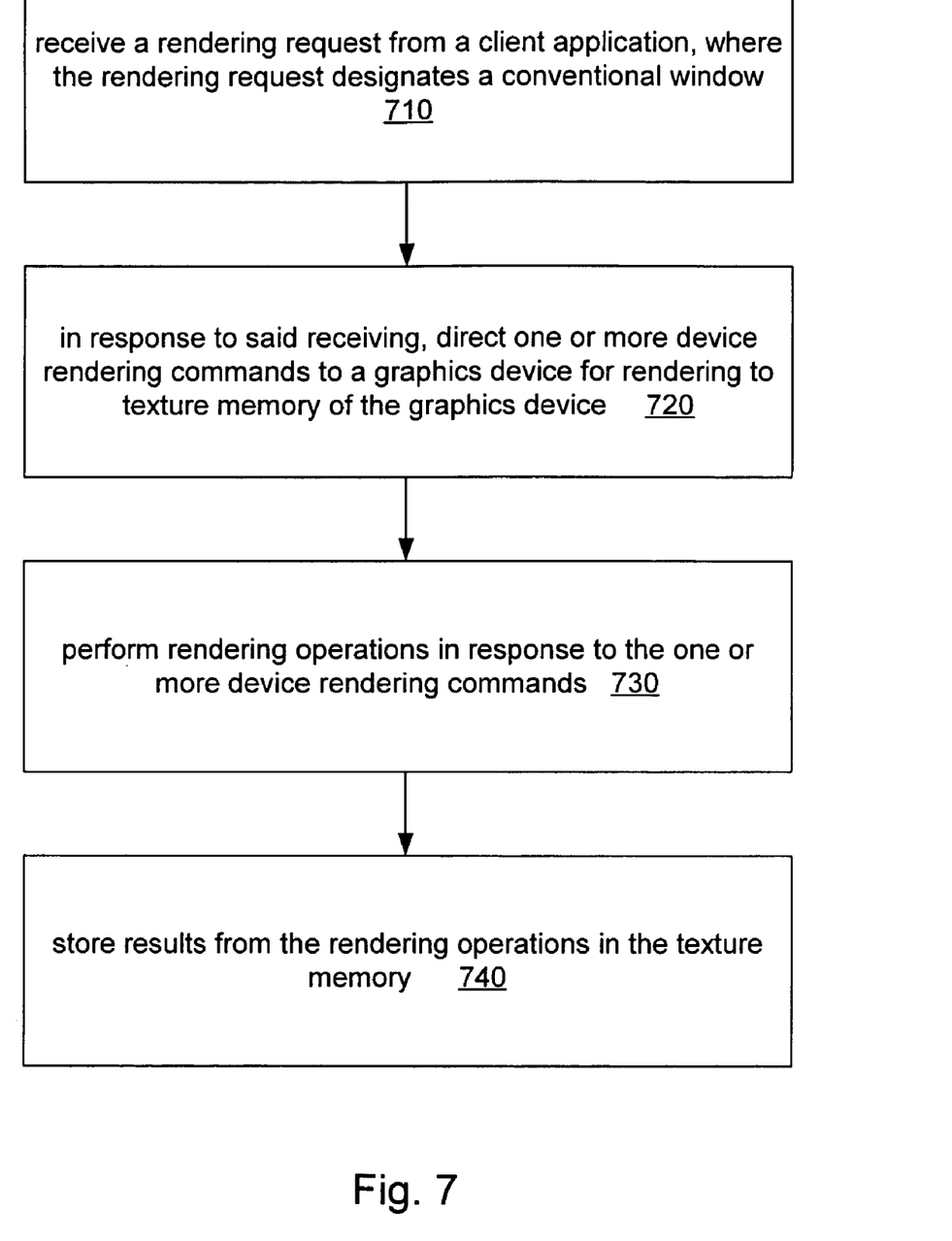
FIG. 7 illustrates one set of embodiments of a method for performing 2D rendering associated with a conventional window.

FIG. 7 illustrates one set of embodiments of a method for performing 2D rendering associated with a conventional window.

In step 710, a window server (such as window server 120 of FIGS. 3 and 4) receives a rendering request from a client application. The rendering request designates a conventional window.

In step 720, the window server directs one or more device rendering commands to a graphics device (such as graphics device 112) in response to receiving the rendering request. The device rendering commands are for inducing the graphics device to render to texture memory.

The graphics device maps the contents of said texture memory onto a surface of a 3D object in a 3D display environment.

In step 730, the graphics device performs rendering operations in response to the one or more device rendering commands.

In step 740, the graphics device stores results from the rendering operations in the texture memory.

Figure 8:
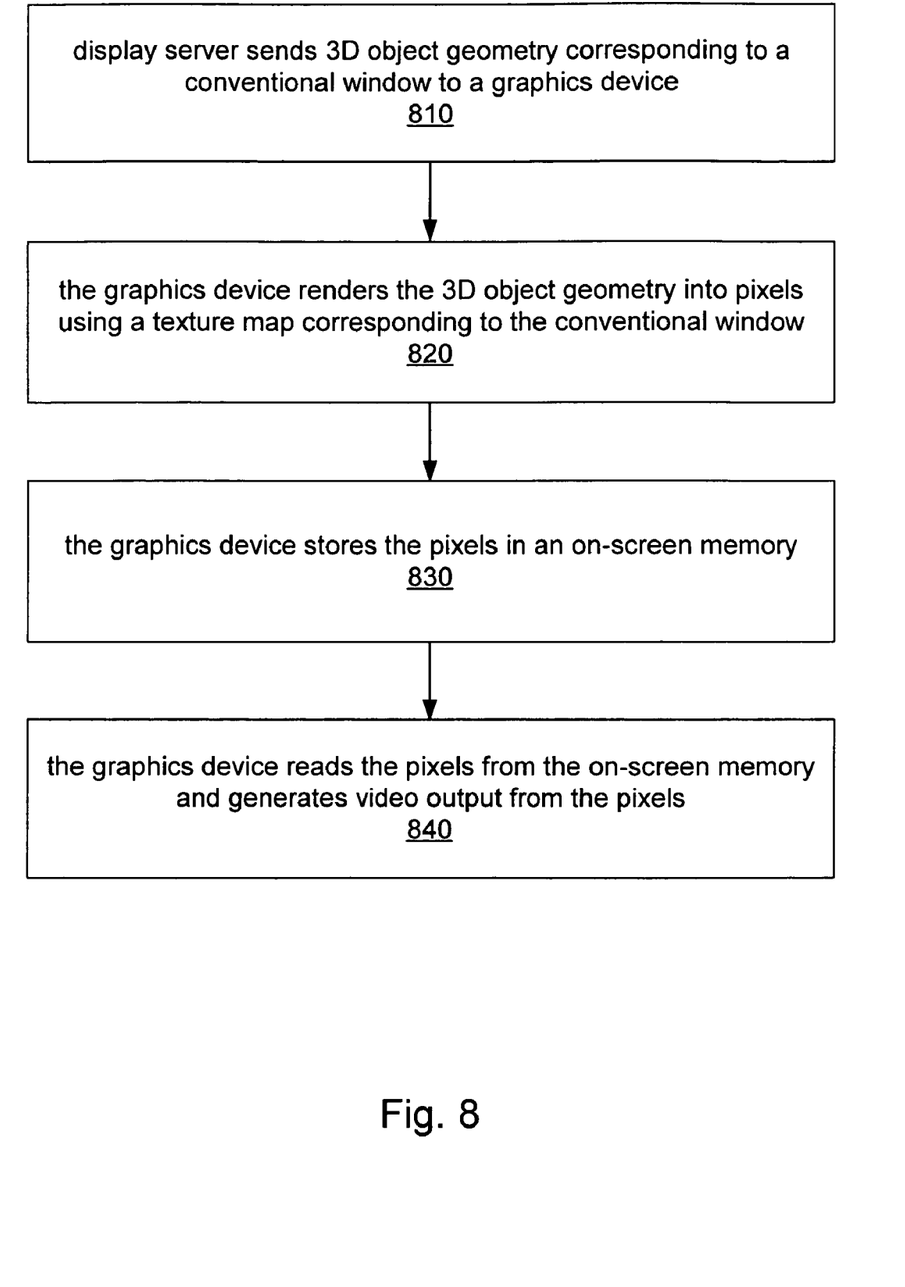
FIG. 8 illustrates one set of embodiments of a method for displaying a 3D object corresponding to a conventional window.

FIG. 8 illustrates one set of embodiments of a method for displaying a 3D object corresponding to a conventional window.

In step 810, a display server (such as display server 122 of FIGS. 3 and 4) sends 3D object geometry corresponding to the conventional window to a graphics device (such as graphics device 112).

In step 820, the graphics device renders the 3D object geometry into pixels using a texture map associated with the conventional window.

In step 830, the graphics device stores the pixels in an on-screen memory of the graphics device.

In step 840, the graphics device reads the pixels from the on-screen memory and generates video output from the pixels.

Figure 9:
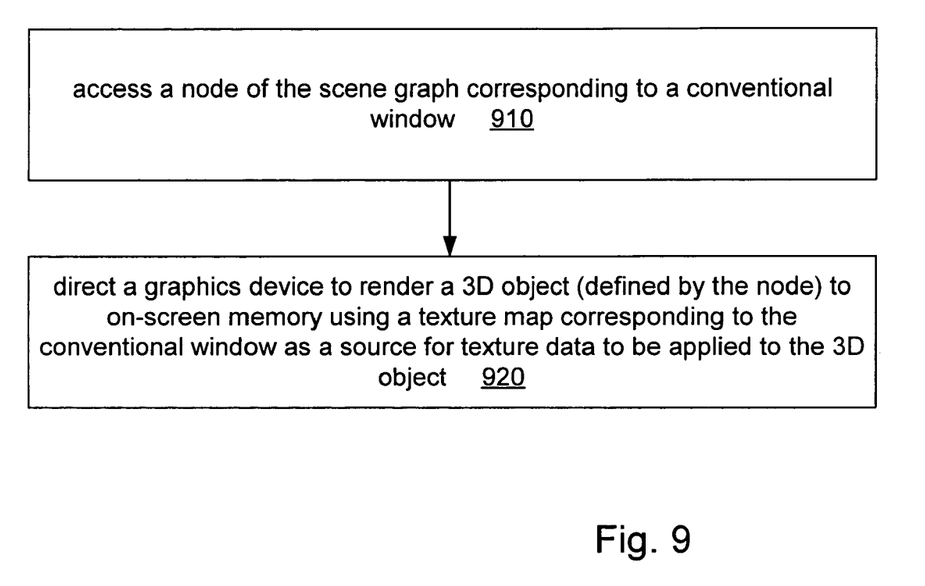
FIG. 9 illustrates one set of embodiments of a method for rendering objects corresponding to conventional window.

As described variously above, the display server may traverse a scene graph in order to induce rendering for the objects in a scene. As part of the scene graph traversal, the display server accesses nodes of the scene graph. A method for rendering objects corresponding to conventional window may involve the following steps as illustrated in FIG. 9.

In step 910, the display server accesses a node of the scene graph corresponding to a conventional window.

In step 920, the display server directs a graphics device (such as graphics device 112) to render a 3D object defined by the node (and corresponding to the conventional window) to on-screen memory using a texture memory (also corresponding to the conventional window) as a source for texture data to be applied to the 3D object.

In one set of embodiments, the window server directs the graphics output of window system device driver graphics routines to render into texture memory. The following are variations.

Variation #1: The set of device driver routines can:
(1) Take the current window as an argument to all (or several routines), or
(2) Support the notion of a "current window" state variable.

Variation #2: The redirection may be implemented via:
(1) A set of intermediate routines and a (possibly) augmented set of device driver routines, or
(2) A modified set of device driver routines, or
(3) A combination of both (1) and (2).

Variation #3: The texture memory into which the graphics output is redirected may be allocated:
(1) When the window is first created, or
(2) When the first driver graphics routine is called.

Variation #4: The window server may support:
(1) A conventional 2D window system interface in order to allow conventional 2D window system clients to run, or
(2) An API which has been designed from scratch, or
(3) A combination of both (1) and (2).

The window server may present an API to client applications which is the same as (or a superset of) the API of any of a variety of conventional 2D window systems. Use of the term "window server" does not imply that a conventional 2D window system must have an identifiable server process in order for the window server to provide support for client applications designed for that conventional 2D window system.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
a first server receiving a rendering request from a client application, wherein the rendering request designates a conventional window;
the first server directing one or more device rendering commands to a graphics device for rendering directly to texture memory of the graphics device, wherein said directing is performed in response to receiving said rendering request;
in response to receiving the one or more device rendering commands, the graphics device performing one or more rendering operations directly to the texture memory such that results of the one or more rendering operations are produced directly to the texture memory; and
the graphics device mapping contents of said texture memory onto a surface of a 3D object in a 3D display environment.

2. The method of claim 1, wherein the first server presents an application programming interface (API) to the client application which includes the API of a conventional 2D window system.

3. The method of claim 1, wherein the first server presents an API to the client application which includes a 3D graphics API.

4. The method of claim 1, wherein the rendering request is a request for 2D rendering.

5. The method of claim 1, wherein the rendering request is a request for 3D rendering.

6. The method of claim 1 further comprising:
the first server allocating a texture map in the texture memory of the graphics device.

7. The method of claim 6, wherein the first server allocates the texture map in the texture memory of the graphics device in response to receiving a request for creation of the conventional window from the client application.

8. The method of claim 1 further comprising:
a second server directing the graphics device to render the 3D object to on-screen memory using the texture memory as a source for texture data to be applied to the 3D object.

9. The method of claim 8 further comprising:
the second server traversing a scene graph, wherein said directing the graphics device to render the 3D object to on-screen memory using the texture memory is performed in response to accessing a scene graph node which corresponds to the conventional window.

10. The method of claim 1 further comprising:
a second server configuring the graphics device for rendering to on-screen memory of the graphics device using the texture memory as a source for texture data;
the second server sending geometry data for the 3D object to the graphics device, wherein the 3D object corresponds to the conventional window.

11. The method of claim 10, wherein the graphics device is configured to render the geometry data into pixels using the texture data from the texture memory and to store the pixels in the on-screen memory;
wherein the graphics device is further configured to read the pixels from the on-screen memory and generate video output from the pixels.

12. The method of claim 10, wherein the second server executes in a separate process from the first server.

13. The method of claim 1 further comprising:
the first server configuring the graphics device for rendering directly to the texture memory of the graphics device in response to receiving the rendering request from the client application.

14. The method of claim 1 further comprising:
the first server configuring the graphics device for rendering directly to in the texture memory of the graphics device in response to receiving a request from the client application to set a current graphics context.

15. The method of claim 1, wherein the first server is part of a 3D window system.

16. The method of claim 1, wherein the client application is a conventional client application.

17. The method of claim 1,
wherein the first server comprises a first set of device independent routines, a second set of intermediate routines, and a third set of device dependent routines;
wherein the first set of device independent routines are the device independent routines of a conventional 2D graphics window system;
wherein the second set of intermediate routines are called by the first set of device independent routines, wherein third set of the device dependent routines are called by the second set of intermediate routines;
wherein a calling interface presented by the second set of intermediate routines to the first set of device independent routines is identical to a calling interface presented by the device dependent routines of the conventional 2D graphics window system to the first set of device independent routines.

18. The method of claim 17, wherein the intermediate set of routines are configured to make calls to the device dependent routines in order to:
(a) send commands to the graphics device to allocate a texture map in the texture memory of the graphics device and to invoke a render-to-texture state of the graphics device with respect to the texture map;
(b) translate said rendering request into the one or more device rendering commands;
(c) send the one or more device rendering commands to the graphics device.

19. The method of claim 17, wherein the third device dependent set of routines include:
the device dependent routines of the conventional 2D window system, and
one or more additional device dependent routines that are usable to configure the graphics device for rendering to the texture memory.

20. The method of claim 17, wherein the third set of device dependent routines include modified versions of at least a subset of the device dependent routines of the conventional 2D graphics window system, wherein the modified versions are usable to configure the graphics device for rendering directly to the texture memory.

21. The method of claim 17, wherein at least a subset of the third set of device dependent routines receive a current window parameter as an argument, wherein the current window parameter designates a current window.

22. The method of claim 17, wherein the third set of device dependent routines are operable to use a state variable that designates a current window.

23. A method, comprising:
a graphics device generating a texture map by performing rendering operations associated with a conventional window, wherein the rendering operations produce the texture map directly into texture memory of the graphics device, wherein the texture map contains image contents of the conventional window;
a display server configuring the graphics device for rendering to on-screen memory using the texture map in the texture memory as a source for texture data;
the display server sending 3D object geometry corresponding to the conventional window to the graphics device;
the graphics device mapping texture data from the texture map onto a surface of a 3D object defined by said 3D object geometry.

24. The method of claim 23, wherein the graphics device is configured to render the 3D object geometry into pixels using the texture map and store the pixels in the on-screen memory;
wherein the graphics device is further configured to read the pixels from the on-screen memory and generate video output from the pixels.

25. A method, comprising:
a graphics device generating a texture map by performing rendering operations associated with a conventional window, wherein the rendering operations produce the texture map directly into texture memory of the graphics device, wherein the texture map contains image contents of the conventional window;
a display server configuring the graphics device for rendering to on-screen memory using the texture map in the texture memory as a source for texture data;
the display server sending 3D object geometry corresponding to the conventional window to the graphics device;
the graphics device mapping texture data from the texture map onto a surface of a 3D object specified by said 3D object geometry.

26. The method of claim 25 further comprising:
the display server traversing a scene graph and identifying a scene graph node corresponding to the conventional window;
wherein said configuring and said sending are performed in response to said identifying the scene graph node corresponding to the conventional window.

27. A computer-accessible storage medium storing program instructions, wherein the program instructions are computer-executable to implement the method recited in claim 1.

28. A system, comprising:
a processor; and
a memory storing program instructions, wherein the program instructions are executable by the processor to implement the method recited in claim 1.

29. A computer-accessible storage medium storing program instructions, wherein the program instructions are computer-executable to implement the method recited in claim 23.

30. A system, comprising:
a processor; and
a memory storing program instructions, wherein the program instructions are executable by the processor to implement the method recited in claim 23.

* * * * *